United States Patent
Jones

[15] 3,682,247
[45] Aug. 8, 1972

[54] USE OF WATER-EXTERNAL MICELLAR DISPERSIONS IN OIL RECOVERY

[72] Inventor: Stanley C. Jones, Littleton, Colo.

[73] Assignee: Marathon Oil Company, Findlay, Ohio

[22] Filed: March 23, 1970

[21] Appl. No.: 22,080

Related U.S. Application Data

[63] Continuation-in-part of Ser. No. 693,125, Dec. 26, 1967, Pat. No. 3,506,071.

[52] U.S. Cl. .................................. 166/273, 166/274
[51] Int. Cl. ............................................. E21b 43/22
[58] Field of Search...166/273, 274, 275; 252/8.55 D

[56] References Cited

UNITED STATES PATENTS 3,506,071    4/1970    Jones.....................166/274 X

*Primary Examiner*—Stephen J. Novosad
*Attorney*—Joseph C. Herring, Richard C. Willson, Jr. and Jack L. Hummel

[57] ABSTRACT

Secondary-type crude oil recovery is effected by injecting into a subterranean formation 1–20 percent formation pore volume of a water-external micellar dispersion of hydrocarbon and petroleum sulfonate dispersed in water and displacing it through the formation to recover crude oil therefrom.

10 Claims, No Drawings

USE OF WATER-EXTERNAL MICELLAR DISPERSIONS IN OIL RECOVERY

CROSS REFERENCE TO RELATED APPLICATIONS

This is a continuation-in-part of my copending application Ser. No. 693,125, now U.S. Pat. No. 3,506,071, filed Dec. 26, 1967.

BACKGROUND OF THE INVENTION

1. Field of the Invention

This invention relates to flooding subterranean formations with miscible-type agents to recover crude oil therefrom. The flooding agent is a water-external micellar dispersion containing hydrocarbon, petroleum sulfonate and aqueous medium.

2. Description of the Prior Art

U.S. Pat. No. 3,266,570 to Gogarty teaches a flooding process using an oil-external soluble oil followed by a water-external emulsion. Gogarty teaches that the back portion of the water-external emulsion improves the miscibility with a subsequent water drive.

U. S. Pat. Nos. 3,330,344 and 3,348,611 to Reisberg teach flooding with aqueous solutions containing swollen micelles of surfactant and an amphiphilic polar organic compound and surfactant and electrolyte. Reisberg teaches that these solutions will solubilize the crude oil in sand packs. Suitable amphiphilic organic compounds include higher molecular weight monohydroxy aliphatic alcohols containing six or more carbon atoms.

SUMMARY OF THE INVENTION

Applicant has discovered that a water-external micellar dispersion comprised of water, hydrocarbon and petroleum sulfonate is useful in secondary-type recovery processes (especially tertiary recovery) to recover crude oil from subterranean formations. Preferably, the micellar dispersions contains semi-polar organic compound and optionally electrolyte. The injection of about 1 to about 20 percent formation pore volume of the micellar dispersion provides efficient recovery of crude oil from a subterranean formation. The micellar dispersion can be followed by a mobility buffer, one purpose of which is to protect the dispersion from invasion of a subsequent water drive.

DESCRIPTION OF THE PREFERRED EMBODIMENTS

This invention is applicable to crude oil recovery processes where artificial means facilitate removal of the oil. More specifically, the invention is applicable to secondary oil recovery and to tertiary recovery processes in subterranean formations which have been reduced to residual oil saturation.

The term micellar dispersion as used herein is meant to include micellar solutions, water-external "microemulsions" [Schulman and Montagne, *Annals of the New York Academy of Sciences*, 92, pages 366–371 (1961)] "transparent" emulsions, and micellar dispersion technology taught by C. G. summer, *Clayton's, The Theory of Emulsions and Their Technical Treatment*, 5th Edition, pp. 315–320 (1954). Micellar dispersions differ from emulsions in many ways, the strongest differentiation being that the former are thermodynamically stable whereas the latter are not.

The micellar dispersions of this invention are water-external. That is, the hydrocarbon phase is internally dispersed. In an oil-external micellar dispersion the water phase is internally dispersed.

The micellar dispersion is composed essentially of hydrocarbon, an aqueous medium, petroleum sulfonate sufficient to impart thermodynamic stability to the solution, semi-polar organic compound and optionally electrolyte. Examples of volume amounts are from 1 percent to about 50 percent hydrocarbon, about 40 percent to about 95 percent aqueous medium, at least about 4 percent sulfonate, about 0.01 percent to about 20 percent of semi-polar organic compound and about 0.001 to about 5 percent by weight of electrolyte. In addition, the dispersions and/or subsequent slugs can contain corrosion inhibiting agents, bactericides, etc.

Examples of hydrocarbon include crude oil (both sweet and sour) and partially refined fractions thereof, e.g., side cuts from crude columns, crude column overheads, gas oils, kerosenes, heavy naphthas, naphthas, straight-run gasoline, and liquefied petroleum gases. Pure hydrocarbons are also useful, e.g. paraffin compounds including propane, pentane, heptane, decane, dodecane, etc.; cycloparaffin compounds including cyclohexane, etc.; aryl compounds including benzene, naphthalene, anthracene, etc.; alkylated products thereof including toluene, alkyl phenols, etc. Based on economics, the preferred hydrocarbon is one locally available and is crude oil. The unsulfonated hydrocarbon (e.g. heavy vacuum gas oils) in petroleum sulfonates is also useful.

The aqueous medium can be soft, brackish, or a brine. Preferably, the water is soft but it can contain small amounts of salts which are compatible with the ions in the subterranean formations being flooded.

Petroleum sulfonates (i.e. surfactants) useful with the micellar dispersion are also known as alkyl aryl naphthenic sulfonates. Such can be obtained by sulfonating at least a portion of a sulfonatable hydrocarbon (e.g. gas oils) and then neutralizing the mixture, e.g. with $NH_4OH$, $NaOH$, etc. Examples of sulfonates include those containing 60–100 percent active sulfonate. The petroleum sulfonates have an average equivalent weight within the range of about 350 to about 525, more preferably about 390 to about 460 and most preferably about 400 to about 420. Equivalent weight is defined by dividing the molecular weight by the number of sulfonate groups attached to the molecule of sulfonate. Sodium and ammonium sulfonates are examples of preferred sulfonates. The sulfonates can be mixtures of low and high average equivalent weight sulfonates.

The semi-polar organic compound (also known as cosurfactant and cosolubilizer) useful with the invention can have limited water solubility. However, compounds having 0 to infinite water solubility are useful. Preferably, they have limited water solubility of about 0.01 percent to about 20 percent and more preferably about 1 percent to about 5 percent at ambient temperature. Examples of semi-polar compounds include alcohols, amides, amino compounds, esters, aldehydes and ketones containing one to about 20 or more carbon atoms and more preferably about three to about 16 carbon atoms. The semi-polar compound is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol, hydroxy compounds such as 2-butoxyethanol, etc, and alcoholic liquors such as fusel oil. Particularly useful alcohols include the primary butanols, primary pentanols, and secondary hexanols. Concentrations of about 0.01 percent to more than 5 volume percent of the semi-polar compound are useful in the micellar dispersion and more preferably about 0.2 to about 3 percent. Mixtures of two or more semipolar compounds are useful in the micellar dispersions.

Electrolytes are useful within the water-external micellar dispersions. Examples of such electrolytes include inorganic bases, inorganic acids, inorganic salts, organic bases, organic acids, and organic salts which are strongly or weakly ionized. Preferably, the electrolytes are inorganic bases, inorganic acids and inorganic salts, e.g. sodium hydroxide, sodium chloride, sodium sulfate, hydrochloric acid, sulfuric acid, sodium nitrate, ammonium chloride, ammonium hydroxide, and potassium chloride. Examples of other useful electrolytes can be found in U.S. Pat. No. 3,330,343. The type and concentration of electrolyte will depend on the aqueous medium, sulfonate, semi-polar organic compound, hydrocarbon and on the reservoir temperature.

The mobility of the micellar dispersion should be about equal to or less than the mobility of the fluids ahead of it, i.e. the combinations of the crude oil and formation water within the subterranean formation. Such a mobility is desired to avoid viscous fingering of the micellar dispersion into the formation fluids.

The volume of the micellar dispersion useful with this invention is about 1 percent to about 20 percent formation pore volume. Larger percentage pore volumes are useful but may be economically unattractive. More preferably, about 2 percent to about 10 percent formation pore volume is useful and 3 percent to about 6 percent formation pore volume gives very efficient results. The micellar dispersion is injected through an injection means into the formation. The injection means include the well bore including the area contiguous to the oil-bearing rock at the bottom of the well.

The size of the mobility buffer (also identified as the front portion of the drive material) can vary from about 5 percent to about 75 percent formation pore volume and more preferably is within the range of about 25 percent to about 60 percent formation pore volume. However, this formation pore volume can be adjusted to satisfy the requirements of the particular reservoir being flooded. The mobility buffer can have a mobility about equal to or less than the mobility of the micellar dispersion. In addition, from about 5 percent to about 100 percent of the mobility buffer can be characterized as having graded mobilities from a low at the front portion of the mobility buffer to a high at the juncture with a subsequent water drive.

After the mobility buffer is injected into the subterranean formation, sufficient water drive is injected to move or displace the water-external micellar dispersion and mobility buffer toward a production means, e.g. production well, in fluid communication with the subterranean reservoir. Crude oil displaced by these injected fluids is recovered through the production well.

The following examples are presented to specifically illustrate working embodiments of the invention. Limitations are not to be implied by these examples. It is intended that all equivalents obvious to those skilled in the art be included within the scope of the invention. Percents are based on volume, unless otherwise specified.

EXAMPLE 1

Fired Berea sandstone cores 4 feet long by 3 inches in diameter having characteristics indicated in Table I are saturated with distilled water containing 18,000 ppm. of Nacl, flooded to irreducible water saturation with a crude oil obtained from the Henry lease in Illinois (hereinafter identified as Henry produced crude and having a viscosity of 5.9 cp. at 72° F. and a specific gravity of 0.833) and are then flooded to residual oil saturation with water obtained from the Henry lease in Illinois (hereinafter identified as Henry plant water, example of an analysis is 17,210 ppm. of total dissolved solids and having a pH of 7.7). The cores are then flooded with the indicated percent pore volumes of a water-external micellar dispersion containing 80.5 percent of water obtained from the Palestine water reservoir in Palestine, Illinois (hereinafter identified as Palestine water, example of an analysis is 412 ppm. of total dissolved solids and having a pH of 7.6–8.0), 8.7 percent of an ammonium alkyl aryl naphthenic sulfonate (having an average equivalent weight of about 440 and containing 78.3 percent active sulfonate and the residue unsulfonated paraffinic oil), 1.1 percent of n-amyl alcohol, 0.5 percent isopropanol, and 9.2 percent of Henry produced crude. After the micellar dispersion is injected into the cores, there is injected 1.2 pore volumes of thickened water solution (mobility buffer) composed of Palestine water, 1,200 ppm. of No. 530 Pusher (a high molecular weight partially hydrolyzed polyacrylamide sold by Dow Chemical Company) and 1% fuel oil. The core characteristics, percent pore volume of micellar dispersion slugs and the results of the flooding tests are indicated in Table I:

TABLE I

| Sample | Core characteristics | | | Percent formation pore volume of micellar dispersion injected into core | Percent recovery of crude oil in core |
| --- | --- | --- | --- | --- | --- |
| | Effective porosity (percent) | Permeability (md.) | Residual oil saturation (percent) | | |
| A | 18.3 | 155 | 32.9 | 1 | 48.5 |
| B | 17.4 | 96 | 35.2 | 2 | 43.2 |
| C | 20.5 | 533 | 33.3 | 4 | 93.8 |
| D | 20.1 | 507 | 36.5 | 5 | 85.6 |

NOTE.—The fluid recovered from Sample C was analyzed and found to contain 32.8% of the ammonium petroleum sulfonate originally incorporated into the micellar dispersion.

EXAMPLE 2

The procedure of Example 1 is repeated except the micellar dispersion is composed of 71 percent Palestine water, 1.3 percent n-amyl alcohol, 0.5 percent isopropanol, 9.9 percent of ammonium petroleum sulfonate, and 17.3 percent of Henry produced crude. The core characteristics, percent pore volumes, and percent crude oil recovery results are indicated in Table II:

TABLE II

| Sample | Core characteristics | | | Percent pore volume of micellar dispersion injected into core | Percent recovery of crude oil in core |
|---|---|---|---|---|---|
| | Effective porosity (percent) | Permeability (md.) | Residual oil saturation (percent) | | |
| A | 20.0 | 275 | 34.3 | 1 | 52.2 |
| B | 20.5 | 564 | 35.4 | 5 | 84.7 |

EXAMPLE 3

Fired Berea sandstone cores 4 feet long by 2 inches in diameter, having characteristics indicated in Table III, are saturated with Henry plant water, flooded to irreducible water saturation with Henry produced crude, and then waterflooded to residual oil saturation with Henry plant water. The cores are then injected with water-external micellar dispersions composed of 27.41 percent Henry produced crude, 6.67 percent of an ammonium petroleum sulfonate (average equivalent weight of about 450 and composed of about 80 percent active sulfonate), 64.62 percent of Palestine water containing 0.98 weight percent of sodium hydroxide, 0.74 percent isopropanol, and 0.56 percent of nonyl-phenol. The micellar dispersion has a viscosity of 29.5 cp. at 72° F. The micellar dispersion injections are followed with 1.25 pore volumes of a thickened water slug composed of 800 ppm. of No. 530 Pusher, 4 percent of isopropanol, 50 ppm. of $NH_4SCN$, and 96 percent of Palestine water.

To show that the water-external systems have comparable recoveries to that of oil-external micellar systems, the above procedure is repeated except the core is flooded with 3 percent pore volume of an oil-external micellar dispersion composed of 59.35 percent of crude column overheads (a heavy naphtha), 7.79 percent of ammonium petroleum sulfonate, 31.35 percent of Palestine water containing 0.94 weight percent of sodium hydroxide, 1.36 percent of isopropanol, and 0.15 percent of nonyl phenol. This micellar dispersion has a viscosity of 33.2 cp. at 72° F. The results of the flooding tests are indicated in Table III:

TABLE III

| Sample | Core characteristics | | | Percent formation pore volume of micellar dispersion injected | Percent recovery of crude oil in core |
|---|---|---|---|---|---|
| | Effective porosity (percent) | Permeability (md.) | Residual oil saturation (percent) | | |
| Water-external systems: | | | | | |
| A | 19.7 | 234 | 35.9 | 3 | 80.1 |
| B | 19.3 | 222 | 35.2 | 5 | 87.3 |
| Oil-external system C | 20.0 | 297 | 36.7 | 3 | 83.1 |

EXAMPLE 4

Fired Berea sandstone cores 4 feet long by 2 inches in diameter having characteristics indicated in Table IV are treated as follows: (1) Samples C,D, and F are first actuated with distilled water containing 16,500 ppm of NaCl, flooded to irreducible water saturation by using Henry crude oil and flooded to residual oil saturation with distilled water containing 16,500 ppm. of NaCl, (2) Samples A, B, C, and G-H are treated as above except they are waterflooded with Henry plant water. Thereafter, the cores are injected with Table IV indicated percent formation pore volumes of water-external micellar dispersions composed of:

Samples A-B  40.25% of Henry crude oil, 7.43% of an ammonium sulfonate having an average equivalent weight of about 450 and being about 80% active sulfonate, 0.83% of isopropanol, 0.34% of nonyl phenol, 51.15% of Palestine water containing 1.201 weight percent of sodium hydroxide.

Samples C-F  26.85% Henry crude oil, 6.47% of the above ammonium petroleum sulfonate, 3.21% of isopropanol, 0.81% of nonyl phenol, 62.66% of Palestine water containing 0.979 weight percent of sodium hydroxide.

Samples G-H  27.42% of Henry crude oil, 6.67% of the above ammonium petroleum sulfonate, 0.74% of isopropanol, 0.56% of nonyl phenol, 64.61% of Palestine water containing 0.979 weight percent of sodium hydroxide.

After the dispersions are injected into the core samples, 1.2 pore volumes of thickened water slugs are injected into the cores, compositions of the thickened water slugs being:

Sample B:  800 ppm. of No. 530 Pusher, 50 ppm. of $NH_4SCN$, 0.08% of isopropanol and 99.9% of Palestine water.

Samples A & C-H:  800 ppm. of No. 530 Pusher, 50 ppm. of $NH_4SCN$, 4% of isopropanol and 96% of Palestine water.

The results of the flooding tests are indicated in Table IV:

TABLE IV

| Sample | Core characteristics | | | Percent pore volume injection of dispersion slug | Percent recovery of crude oil in core | Percent recovery of sulfonate injected |
|---|---|---|---|---|---|---|
| | Effective porosity (percent) | Permeability (md.) | Residual oil saturation (percent) | | | |
| A | 19.5 | 221 | 37.2 | 3 | 76.2 | 11.4 |
| B | 18.6 | 222 | 38.8 | 3 | 73.0 | 2.8 |
| C | 17.9 | 127 | 38.9 | 5 | 85.3 | 99.3 |
| D | 17.4 | 79 | 38.7 | 11 | 82.1 | 80.1 |
| E | 19.1 | 180 | 35.3 | 3 | 67.1 | 99.7 |
| F | 19.3 | 121 | 37.8 | 20 | 97.0 | 78.2 |
| G | 19.3 | 233 | 36.2 | 3 | 89.8 | 11.3 |
| H | 19.6 | 387 | 34.6 | 5 | 99.6 | 52.9 |

EXAMPLE 5

Fired Berea sandstone cores 4 feet long by 2 inches in diameter having characteristics indicated in Table V are saturated with distilled water containing 18,000 ppm. of NaCl, flooded with Henry crude oil to irreducible water saturation and then flooded with Henry plant water to residual oil saturation. The cores are then flooded at ambient temperature with indicated percent formation pore volumes of a micellar dispersion having the compositions indicated in Table V:

TABLE V

| Component | Micellar dispersion composition (percent) | | |
|---|---|---|---|
| | "A" | "B" | "C" |
| Aqueous medium: | | | |
| (1) Henry plant water | 34.8 | 89.75 | 93.15 |
| (2) Palestine water | 52.2 | | |
| Sulfonate, ammonium petroleum sulfonate having: | | | |
| (a) Average eq. wt.=440; 78.3% active sulfonate | | 8.24 | |
| (b) Average eq. wt.=450; 78.8% active sulfonate | | | 5.69 |
| (c) Average eq. wt.=440; 87.6% active sulfonate | 9.55 | | |
| Semi-polar organic compound: | | | |
| (1) n-Amyl alcohol | 3.38 | 1.57 | 0.35 |
| (2) n-Butyl alcohol | | | 0.19 |
| (3) Isopropanol | 0.07 | 0.44 | 0.62 |
| Viscosity at 72° F | 47.4 | 16.0 | 17.0 |

The core samples are then flooded with 1.2 formation pore volumes of a thickened water solution having the following compositions:

Sample A-1: Palestine water containing 1% fusel oil and 1200 ppm. of No. 530 Pusher.

Samples B-1, B-2, and C-1: Palestine water containing 1% of n-butanol and 1200 ppm. of No. 530 Pusher.

Results of the flooding tests are indicated in Table VI:

TABLE VI

| Sample | Core characteristics | | | Micellar dispersion | | Percent recovery of crude oil in core |
|---|---|---|---|---|---|---|
| | Effective porosity (percent) | Permeability (md.) | Percent residual oil saturation | Type | Percent formation pore volume injected into core | |
| A-1 | 20.2 | 430 | 37.9 | A | 2.5 | 87.2 |
| B-1 | 21.1 | 535 | 28.4 | B | 5.0 | 77.3 |
| B-2 | 17.3 | 129 | 37.5 | B | 5.0 | 72.4 |
| C-1 | 21.3 | 481 | 31.4 | C | 5.0 | 74.2 |

NOTE.—This example shows that the hydrocarbon in the sulfonate (i.e. the sulfonate contains the indicated percent active sulfonate and the residue is unsulfonated hydrocarbon) will suffice in the micellar dispersions of this invention.

What is claimed is:

1. A process for recovering crude oil from an oil-bearing subterranean formation having at least one injection means in fluid communication with at least one production means, comprising injecting into the formation a water-external micellar dispersion comprised of at least about 2 percent hydrocarbon, an aqueous medium, and petroleum sulfonate having an average equivalent weight within the range of about 360 to about 520 and displacing the micellar dispersion toward the production means to recover crude oil therefrom.

2. The process of claim 1 wherein the water-external micellar dispersion contains semi-polar organic compound.

3. The process of claim 1 wherein the water-external micellar dispersion contains electrolyte.

4. The process of claim 1 wherein the micellar dispersion contains at least about 4 percent by volume of the sulfonate.

5. The process of claim 1 wherein a mobility buffer is injected into the formation after the micellar dispersion is injected therein.

6. The process of claim 1 wherein the micellar dispersion contains at least about 10 percent by volume of hydrocarbon.

7. A process for recovering crude oil from an oil-bearing subterranean formation having at least one injection means in fluid communication with at least one production means, comprising:

1. injecting into the formation about 1 percent to about 20 percent formation pore volume of a water-external micellar dispersion comprised of at least about 2 percent by volume hydrocarbon dispersed in an aqueous medium, at least about 4 percent by volume of petroleum sulfonate having average equivalent weight of about 360 to about 525,
2. injecting a mobility buffer into the formation, and
3. injecting sufficient water drive into the formation to displace the micellar dispersion and mobility buffer toward a production means and recovering crude oil through said production means.

8. The process of claim 7 wherein the micellar dispersion contains semi-polar organic compound.

9. The process of claim 7 wherein the micellar dispersion contains electrolyte.

10. The process of claim 7 wherein the mobility of the mobility buffer is about equal to or less than about the mobility of the formation fluids within the subterranean formation.

* * * * *

PO-1050
(5/69)

UNITED STATES PATENT OFFICE
CERTIFICATE OF CORRECTION

Patent No. 3,682,247      Dated Sept. 13, 1972

Inventor(s) Stanley C. Jones

It is certified that error appears in the above-identified patent and that said Letters Patent are hereby corrected as shown below:

| | |
|---|---|
| Col. 1, line 40: | Delete "dispersions" and insert --dispersion--. |
| Col. 4, line 41: | Delete "fuel" and insert --fusel--. |
| Col. 6, line 6: | Delete "actuated" and insert --saturated--. |

Signed and sealed this 23rd day of January 1973.

(SEAL)
Attest:

EDWARD M.FLETCHER,JR.      ROBERT GOTTSCHALK
Attesting Officer      Commissioner of Patents

Disclaimer 3,682,247.—*Stanley C. Jones*, Littleton, Colo. USE OF WATER-EXTERNAL MICELLAR DISPERSIONS IN OIL RECOVERY. Patent dated Aug. 8, 1972. Disclaimer filed Oct. 9, 1981, by the assignee, *Marathon Oil Co.*

Hereby enters this disclaimer to all of the claims of said patent.

[*Official Gazette January 26, 1982.*]